United States Patent
Pigeonnat

(10) Patent No.: US 6,724,743 B1
(45) Date of Patent: Apr. 20, 2004

(54) METHOD OF CONJOINT DETECTION OF A SET OF CDMA CODES

(75) Inventor: Yvan Pigeonnat, St-Nazaire-les-Eymes (FR)

(73) Assignee: France Telecom (FR)

( * ) Notice: Subject to any disclaimer, the term of this patent is extended or adjusted under 35 U.S.C. 154(b) by 0 days.

(21) Appl. No.: 09/562,526

(22) Filed: May 2, 2000

(30) Foreign Application Priority Data

May 4, 1999 (FR) .......................................... 99 05642

(51) Int. Cl.$^7$ .............................................. H04B 7/216
(52) U.S. Cl. ...................... 370/335; 370/342; 370/461; 370/479; 375/130; 375/229; 708/308; 708/322
(58) Field of Search ................................ 370/335, 342, 370/203, 206, 461, 479; 375/229, 130, 140, 141, 145, 149; 708/308, 322, 323

(56) References Cited

U.S. PATENT DOCUMENTS

| | | | |
|---|---|---|---|
| 5,559,723 A | * | 9/1996 | Mourot et al. .............. 375/229 |
| 5,905,946 A | * | 5/1999 | Lilleberg et al. .............. 455/63 |
| 5,933,457 A | * | 8/1999 | Hottinen ..................... 375/316 |
| 6,161,209 A | * | 12/2000 | Moher ........................ 714/780 |
| 6,615,024 B1 | * | 9/2003 | Boros et al. ................ 455/67.4 |

* cited by examiner

*Primary Examiner*—Steven H. D. Nguyen
*Assistant Examiner*—Roberta Stevens
(74) *Attorney, Agent, or Firm*—Piper Rudnick LLP

(57) ABSTRACT

A method of conjoint detection of a set of CDMA codes received at a plurality of antennas of a receiver like a mobile telephone receiver. The codes are transmitted via a transmission channel with transfer matrix A satisfying the equation $e = A.d + n$, where d is the set of symbols of the codes transmitted, n is an additional noise vector and e is the set of received samples. For a transfer sub-matrix $A_S$ corresponding to a number S of rows of blocks of the transfer matrix A, a set of equalising filters are determined for successively estimating all the symbols transmitted by the CDMA codes on the basis of a particular number of received samples

5 Claims, 4 Drawing Sheets

METHOD OF CONJOINT DETECTION OF A SET OF CDMA CODES

FIELD OF THE INVENTION

The invention relates to a method of conjoint detection of a set of CDMA codes used in mobile telephony.

BACKGROUND OF THE INVENTION

The Universal Mobile Telecommunications System (UMTS) is the new mobile telephony standard intended to replace the GSM standard. The first commercial applications of the new standard should see the light of day between year 2000 and year 2005.

Compared to the aforementioned GSM standard, the main improvements are as follows: although in the GSM each base transceiver station can dialogue only with eight mobile stations, with a maximum bit rate of 13 kbit/s for each mobile station, the UMTS increases the number of users and can allocate each mobile station resources for transmitting information at bit rates from 4 kbit/s to 2 Mbit/s, depending on the nature of the information transmitted, such as voice, data, video telephony, hi-fi audio or video.

With this aim in view, two solutions have been adopted in Europe with regard to the multi-user ratio access technique, namely the wideband-CDMA technique in Frequency Division Duplex (FDD) mode and the TDMA/CDMA technique with conjoint detection in Time Division Duplex (TDD) mode.

A major drawback of the TDMA/CDMA technique in the TDD mode is the great complexity of conjoint detection of CDMA codes, conjoint detection being defined as simultaneous detection of all CDMA codes received at various antennas and simultaneously active, unlike the rake receiver habitually used in CDMA, which detects one code at a time, the other codes being regarded as jamming signals.

OBJECT OF THE INVENTION

The object of the present invention is to remedy the aforementioned drawbacks by using a simplified method of conjoint detection of CDMA codes.

One particular object of the present invention is to provide a method of conjoint detection of CDMA codes in which a successive process is used, each successive call request leading to the application of simplified conjoint detection of a symbol for each CDMA code simultaneously active, the next call request conjointly detecting all the symbols of all the CDMA codes simultaneously active.

SUMMARY OF THE INVENTION

The method of conjoint detection of a set of K simultaneously active CDMA codes received at Ka antennas of a mobile transceiver applies to codes transmitted via a multipath stationary linear transmission channel with Gaussian additional white noise and satisfying the equation $e=A.d+n$ where A is the transfer matrix of said multipath stationary linear channel, d is the set of symbols of the codes to be transmitted, n is the additional noise vector and e is the set of received samples. An estimate $\delta$ of the set d of symbols of the codes is obtained by pseudo-inversion of said transfer matrix of the form $\delta=(A^+.A)^{-1}.A^+.e$ where the symbol+ denotes the transposition and complex conjugation operator. A characteristic feature of the method according to the invention is that, for a set of transfer sub-matrices $A_S$ corresponding to a number S of rows of blocks of said transfer matrix A, it determines a set of equalising filters for successively estimating all the symbols transmitted by the CDMA codes from a particular number of received samples $e_S$.

BRIEF DESCRIPTION OF THE DRAWINGS

The invention will be better understood after reading the following description and referring to the accompanying drawings, in which, in addition to FIG. 1a to 1d which relate to the prior art:

FIGS. 2a and 2b constitute a diagram illustrating the method in accordance with the present invention of conjoint detection of a set of CDMA codes.

DETAILED DESCRIPTION OF THE INVENTION

Before describing the method of conjoint detection of a set of CDMA codes in accordance with the present invention as such, various technical features of the process of transmitting TDMA frames and of conjoint detection of those frames will be described with reference to FIGS. 1a, 1b, 1c and 1d.

Figure 1A:
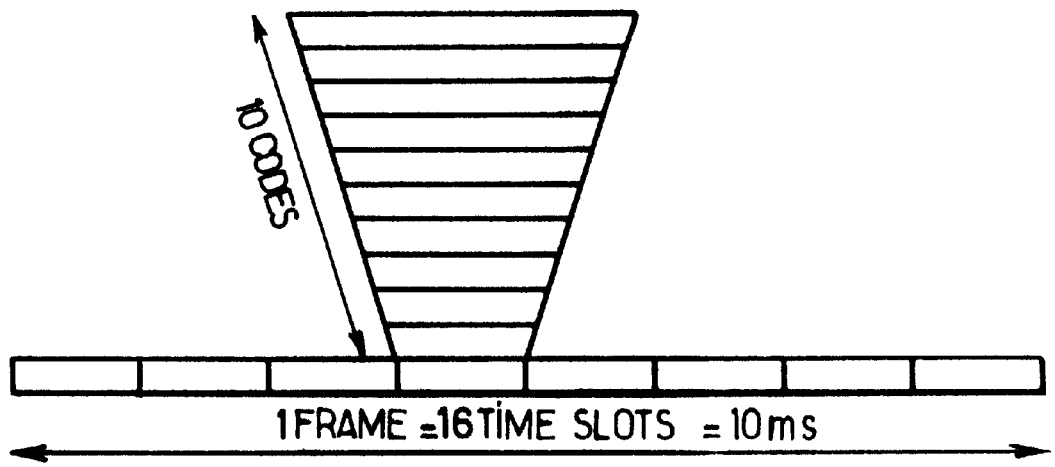

Referring to FIG. 1a, a TDMA frame has a duration of 10 ms and is divided into sixteen time slots. Up to ten bursts of data can be transmitted in each time slot thanks to the use of orthogonal CDMA codes. The introduction of the CDMA codes introduces spreading by a factor of 16.

A time-slot represents 1 250 chip times, the term "chip" referring to an oversampling process to bring about spectrum spreading after multiplication by a bit stream.

Figure 1B:
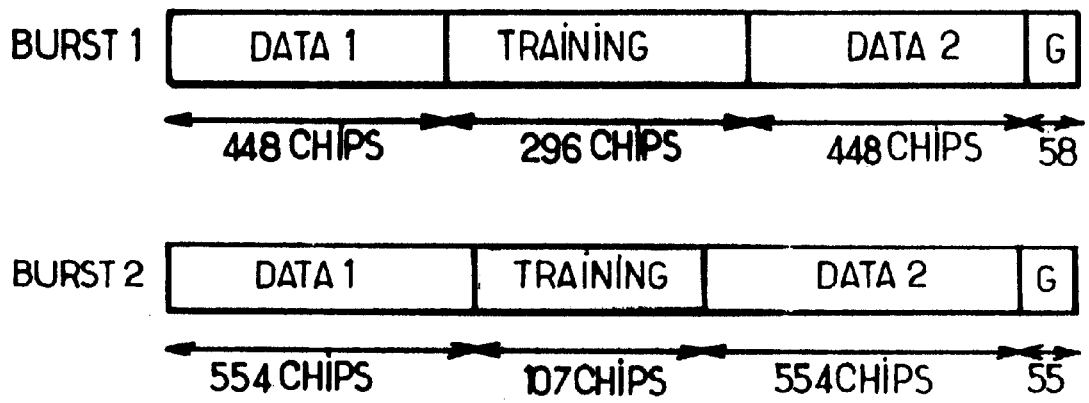

As shown in FIG. 1b, the aforementioned process provides two burst structures, denoted Burst1 and Burst2. Each structure includes a training sequence for estimating the channel, a guard time G at the end of the burst and two blocks of data respectively containing 2×28 and 2×34 symbols.

Assume that K CDMA codes are active simultaneously. Each CDMA code transmits 2×N data symbols in a burst (see FIG. 1b). Each data symbol of duration $T_S$ is spread by a CDMA code of length Q, which is also referred to as the spreading factor.

Accordingly, the radio channel transmits Q chips of duration $T_C=T_S/Q$ for each data symbol.

The mobile receiver has Ka antennas, the number Ka of antennas being at least equal to 2.

The chips transmitted are therefore received via Ka radio channels which can be characterised by the column vector of their impulse response denoted $h^{(ka)}$ (ka=1 to Ka), the impulse response being sampled at the chip time previously referred to.

Table 1 below summarises the parameters which influence the complexity of conjoint detection.

TABLE 1

| NAME | REFERS TO | VALUE |
|---|---|---|
| K | Number of codes used in time slot concerned | 1 to 10 |
| N | Number of useful symbols in a half-burst | 28 or 34 |
| Q | Spreading factor | 16 |

TABLE 1-continued

| NAME | REFERS TO | VALUE |
|---|---|---|
| Ka | Number of antennas | 2 (mobile station) or more (BTS) |
| W | Length of channel expressed in chip times | 1 to 120 |
| P | Length of channel expressed in symbol times | 1 to 8 |
| S | Number of slots per frame concerning user | 1 to 8 |
| $T_C$ | Chip time | 0.462 µs |
| $T_S$ | Symbol time (=16 $T_C$) | 7.38 µs |
| TS | Time slot (=1 250 $T_C$) | 577 µs |
| TT | Frame time (=16 TS) | 10 ms |

W denotes the length of the aforementioned column vectors, also referred to as the channel length expressed in chip times.

d is the temporally ordered column vector of N×K data symbols transmitted in a half-burst. Thus the column vector d is obtained by classifying the data before spreading, taking the first symbols of each code first, then the second symbols of each code, and so on, and finally the $N^{th}$ symbols of each code. The first K symbols of the column vector d are the first of each of the K codes, then the second, and so on.

e is the column vector of the samples received at all the Ka antennas, taking the first samples first, then the second samples, and so on.

After passing through the global transmission channel, i.e. spreading sequence+radio channel, each data symbol transmitted contributes to the reception of Q+W−1 samples at each antenna. For the $k^{th}$ CDMA code, with 1<k<K, the transmission of a data symbol through the aforementioned global channel leads to the reception of Q+W−1 samples at each antenna. The global channel can therefore be considered as a channel with Q+W−1 paths whose impulse response is the column vector satisfying the equation:

$$b^{(ka,k)} = h^{(ka)} * c^{(k)}$$

In the above equation, $c^{(k)}$ is the sequence corresponding to the $k^{th}$ CDMA code transmitted.

Because each symbol is transmitted over Q chip times, N×Q+W−1 samples are obtained at each antenna of the receiver.

Figures 1C, 1D:
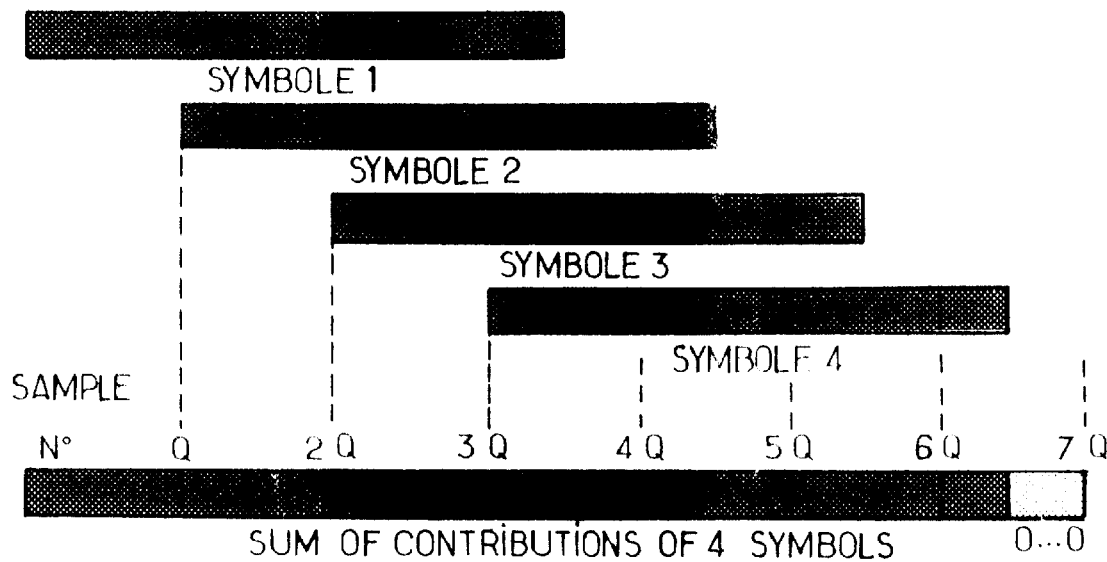

The sum of the contributions of four successive symbols Symbol1, Symbol2, Symbol3 and Symbol4, for N=4 symbols, W−1=2 and P=3 is represented in FIG. 1c.

With reference to the formal approach previously introduced, it is then possible to write the following matrix equation:

$$e = A.d + n$$

In this equation, A is a transfer matrix of the previously mentioned multipath stationary linear channel relating to the global channel and n is a Gaussian additive white noise column vector.

To highlight the symmetry of the aforementioned matrix A, the total number of samples received must be a multiple of the spreading factor Q. To this end, null samples can be added, which leads to the adding of null coefficients at the end of the $b^{ka,k}$. If P is the integer part of (W−1)/Q, representing the length of the channel expressed in symbol times, (N+P).Q samples are received at each antenna because of the introduction of the null samples and the null coefficients of the matrix A concerned.

The matrix A of size [(N+P).Ka.Q×N.K] is shown in FIG. 1d and is made up of sub-matrices $B_i$ with dimensions [Ka.Q×K] constructed in the following manner:

each of the K columns of each sub-matrix $B_0$ to $B_p$ shown in FIG. 1d corresponds to the interleaved $K_a$ global channels (coding+radio channel). The concept of interleaving corresponds to the ordering of the first coefficients for each antenna, then the second coefficients, then the third coefficients, and so on, to the Ka antennas. This is because each symbol transmitted makes a contribution to Q+W−1 samples at each antenna, i.e. in total Ka. (Q+W−1) samples. Allowing for a few null contributions, this yields Ka.Q.(P+1).

Accordingly, the $k^{th}$ column of each column sub-matrix relating to each code from 1 to N is given by the equation:

$$(b_1^{(1,k)} \ldots b_1^{(Ka,k)} \; b_2^{(1,k)} \ldots b_2^{(Ka,k)} \; \ldots \; b_{Q+W-1}^{(1,k)} \ldots b_{Q+W-1}^{(Ka,k)} \; 0 \ldots 0)^T$$

In the above equation the terms $b_1^{(1,k)} \ldots b_1^{(Ka,k)}$ to $b_{Q+W-1}^{(1,k)} \ldots b_{Q+W-1}^{(Ka,k)}$ underlined with a double-headed arrow designate the contribution of the first, second and third elements of rank Q+W−1 to the impulse response of the multipath global channel.

The transfer matrix A is known after the channel estimation phase, which uses training sequences. The transfer matrix A can be constructed by calculating the convolutional product of the estimate of the impulse response of the channel by the CDMA codes. The object of conjoint detection is to calculate an estimate δ of the temporally ordered column vector d of the N.K data symbols transmitted in a half-burst from the column vectors e of the samples received at all the Ka antennas, and of course of the transfer matrix A.

The standard Zero-Forcing Block Linear Equalizer (ZF-BLE) conjoint detection process calculates the estimate δ from the equation:

$$\delta = (A^+.A)^{-1}.A^+.e$$

In the above equation, the exponent + represents the transconjugation operator and the exponent −1 designates the inversion operator.

In fact, the aforementioned estimate consists in a pseudo-inversion of the transfer matrix A.

The estimation process can then be divided into two phases:

The despreading phase to return to the small sizes of the vectors and matrices used by calculating $A^+.A$ and $y = A^+.e$.

A phase of solving the linear system of equations $y = A^+.A.\delta$. The matrix $A^+.A$ being Hermitian, and defined as positive, the aforementioned solution can be effected using a Cholesky decomposition and then solving two triangular systems.

The method previously described implies a critical conjoint detection complexity on the downlink. The table below represents the results of a complexity study in the difficult situations of a loaded network and a long channel, for the various services planned for the UMTS:

TABLE 2

| SERVICE | VOICE | 384 kbit/s | 2 Mbit/s |
|---|---|---|---|
| Channel length expressed in symbol times | 7 | 7 | 3 |
| Number of slots to decode per frame | 1 | 2 | 8 |

TABLE 2-continued

| SERVICE | VOICE | 384 kbit/s | 2 Mbit/s |
|---|---|---|---|
| Spreading complexity (per cent) | 29% | 29% | 34% |
| Linear system complexity (per cent) | 71% | 71% | 66% |
| Total complexity (in MOPs) | 175 | 350 | 570 |

The total complexity expressed in terms of millions of operations per second, where an operation is defined as a multiplication-complex accumulation, is at the limit of the capabilities of present day digital signal processors.

The object of the method according to the present invention is to reduce this complexity.

The method according to the present invention of conjoint detection of a set of CDMA codes is based on the observation that approximately 70% of the total complexity of conjoint detection is associated with solving the linear system of equations. This is because, for the most part, the complexity of conjoint detection results from the size of the matrices manipulated, which is in turn the result of the block processing method used. In the example previously given, the size of the transfer matrix A is 2 432×690.

Figures 2A, 2B:
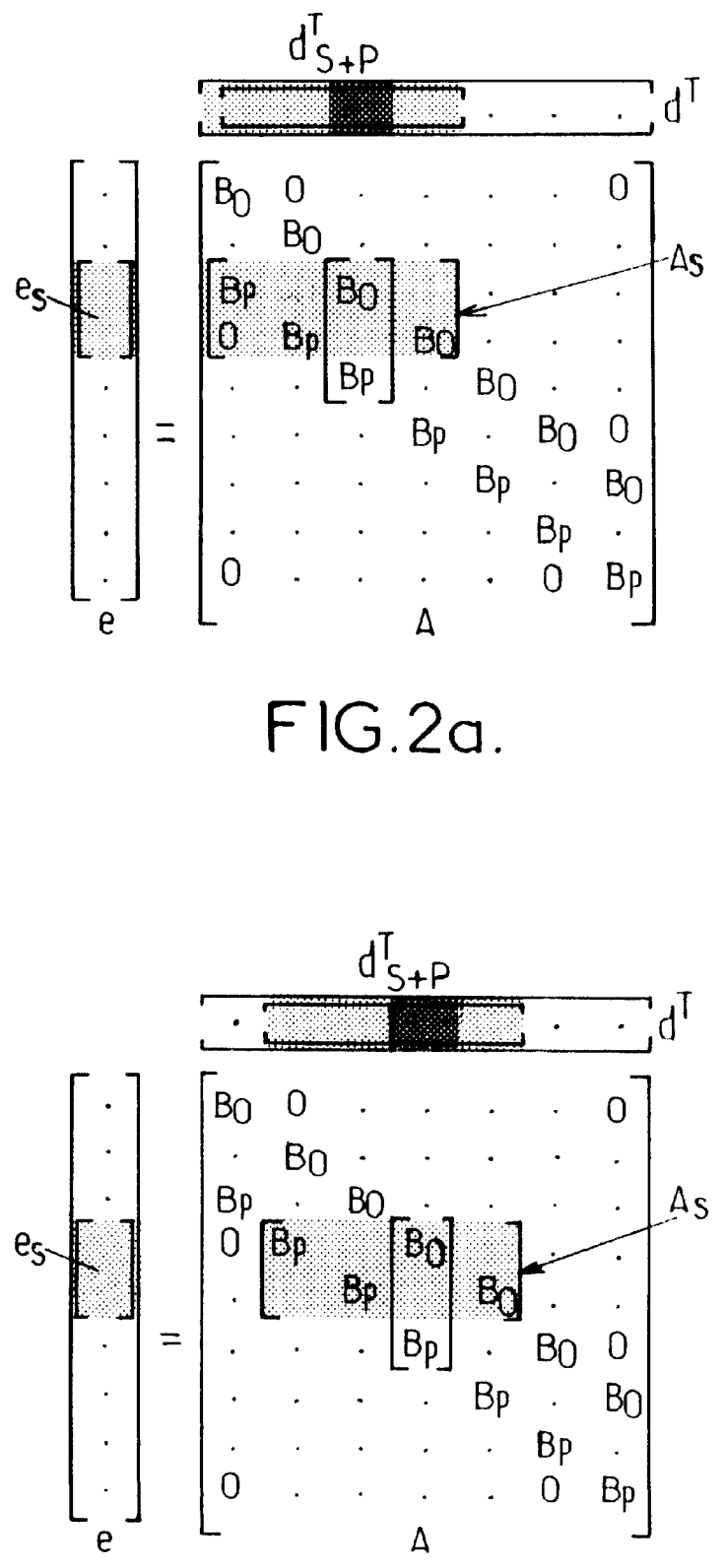

Consequently, and referring to FIGS. 2a and 2b, the method, according to the present invention of conjoint detection of a set of K CDMA codes received at the Ka antennas of a mobile transceiver and active simultaneously consists of considering the transmission of those codes through a multipath stationary linear transmission channel with Gaussian additive white noise satisfying the equation e=A.d+n previously referred to, in which A is the transfer matrix of the multipath stationary linear channel, d is the set of symbols of the various codes transmitted, n is the additional noise vector and e is the set of samples received.

In order to obtain an estimate $\delta$ of the set d of symbols of the codes transmitted, the method according to the present invention consists of pseudo-inversion of the transfer matrix A, of the form $\delta=(A^+.A)^{-1}.A^+.e$ previously mentioned.

A characteristic feature of the method is that it further consists of determining a set of equalising filters for successively estimating all the symbols transmitted by the CDMA codes for a transfer sub-matrix $A_S$ corresponding to a number S of rows of blocks of the transfer matrix A from a particular number of received samples.

The column sub-matrix of the blocks $B_i$ with i=0 to p, i.e. the sub-matrix $B_0$ to $B_p$ shown in FIG. 1d or FIG. 2a and 2b designates the transfer matrix of all the symbols transmitted at the same time to the Ka antennas.

As shown in FIGS. 2a and 2b, for S flows of blocks of the transfer matrix A, each transfer sub-matrix $A_S$ satisfies the following equation:

$$e_S = A_S . d_{S+P}. \quad (1)$$

In the above equation, $e_S$ is the sub-set of samples received at the Ka antennas, comprising S blocks of samples. Starting from this equation, it is possible to estimate the $(P+1)^{th}$ block of $d_{s+p}$, which corresponds to one symbol for each CDMA code active simultaneously, provided that the number S satisfies the following equation:

$$(S+P).K < Ka.Q.S \quad (2)$$

In the above equation, Q is the spreading factor of the CDMA code applied to each symbol transmitted and P is the length of the channel expressed as a number of symbol periods $T_S$.

By successively shifting a block relative to the vector d of the code symbols and the vector e of the samples, as shown in FIG. 2b, the same transfer sub-matrix $A_S$ is transformed from symbols to samples and it is therefore possible to construct a set of equalising filters from this sub-matrix, one filter for each code successively retrieving the symbols transmitted from a particular number of samples received at the Ka antennas of the receiver.

The shifting process shown in FIGS. 2a and 2b can be used from the start to the end of the vector of the samples by applying a sliding window with a corresponding increment Ka.Q to obtain all the symbols transmitted by the aforementioned code successively.

Accordingly, referring to FIGS. 2a and 2b, to arrive at the estimate concerned the same sub-matrix $A_S$ is used to calculate successively all the blocks of the matrix of the symbols.

In FIGS. 2a and 2b $d_{S+P}^T$ is the transposed (row) vector of the (column) vector $d_{S+P}$.

The method according to the present invention remains valid for the ends of the vector d of the symbols of the various codes. This is because adding the two ends of null blocks to the aforementioned vector d has no harmful consequences, the previous equation relating each transfer sub-matrix $A_S$, the vector of the symbols of the corresponding codes and the vector of the samples $e_S$ remaining valid.

The minimum size of the sub-matrix to take into account is given by equation (2) and is used to estimate a block of the vector $d_{S+P}$. That equation indicates that the vector $e_S$ must be longer than the vector $d_{S+P}$.

However, performance can be enhanced by using all the samples to which the block to be estimated of the vector d has made a contribution. This approach provides table 3 below which shows, as a function of P, the range in which the value S must be chosen. The best value is the value corresponding to the required complexity/performance trade-off.

TABLE 3

| P | 1 | 4 | 7 |
|---|---|---|---|
| $S_{MIN}$ | 1 | 2 | 4 |
| $S_{MAX}$ | 2 | 5 | 8 |

Note that choosing $S=S_{max}$ nevertheless implies that the transfer sub-matrix $A_S$ nevertheless has ten times fewer rows and five times fewer columns than the transfer matrix A.

Moreover, according to one particularly characteristic feature of the method of the present invention, for a transfer matrix A with dimensions [Ka.Q.(N+P)xK.N], which may be considered as a matrix of size [(N+P)xN] made up of blocks of size [Ka.QxK], the multi-dimensional equalising filters are formed by the (P+1)th row of blocks of the matrix $A_S^{-1}$ which is the pseudo-inverse of the transfer sub-matrix $A_S$ and which satisfy the equation:

$$(A_S)^{-1} = (A_S^+ . A_S)^{-1} . A_S^+$$

If, additionally, only one code is allocated to the mobile receiver, it is then sufficient to calculate the row (of the calculated block row $A_S^{-1}$) corresponding to the required code.

Accordingly, the $k^{th}$ row of that row of blocks defines the equaliser filter for the $k^{th}$ code.

If direct calculation of the pseudo-inverse matrix of the transfer sub-matrix $A_S$ proves too complex, then the same type of solution can be used as in standard conjoint detection.

Generally speaking, the data decoded is the result of filtering the product $A_S^+ . e_S$ by the calculated rows of $(A_S^+ \cdot A_S)^{-1}$. Accordingly, $(S+P) \cdot K$ multiplications are necessary for each data symbol. If the mobile station is allocated only one code, the overall complexity of this step becomes $(S+P) \cdot K \cdot N$ multiplications, which represents a negligible quantity compared to the standard conjoint detection process.

A more detailed description of a preferred embodiment of the conjoint detection method according to the present invention will now be given with reference to FIG. 3.

Generally speaking, the method of the present invention includes a phase of organising the data followed by a calculation phase defining the filter process applied to all of the samples received constituting the column vector e of the received samples.

Figure 3:
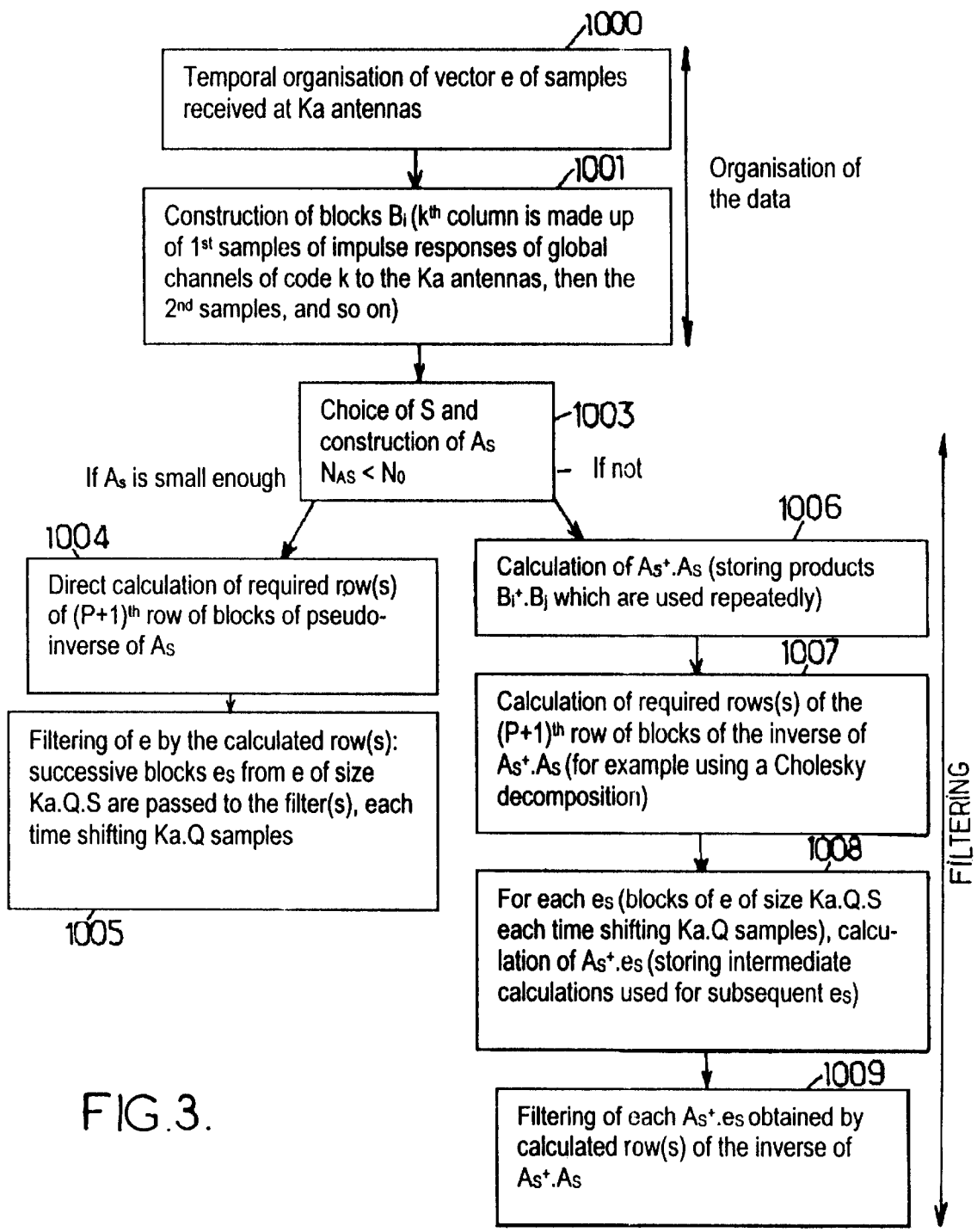
FIG. 3 is one illustrative example of a flowchart of a preferred embodiment of the method according to the present invention of conjoint detection of a set of CDMA codes.

As shown in FIG. 3, the data organisation phase can include a step 1000 which temporally organises the column vector e of the samples received at the Ka antennas. Step 1000 can be followed by a step 1001 which constructs the blocks $B_i$ constituting the transfer matrix A previously referred to. According to one specific feature of the method of the present invention, step 1001 can consist of establishing blocks $B_i$ so that the $k^{th}$ column is formed by the first samples of the impulse responses of the global channels of the $k^{th}$ code to the Ka antennas and then the second samples, and so on, as referred to previously.

The data organising phase previously mentioned, consisting of steps 1000 and 1001, can then be followed by a filtration phase.

The filtration phase can include, as also shown in FIG. 3, a step 1003 of choosing the number S of rows of the transfer matrix A to constitute the sub-matrix $A_S$ as previously mentioned. S can be chosen in accordance with the criteria previously referred to in connection with table 3. Step 1003 also includes a criterion step testing the number of elements of the sub-matrix $A_S$ thus constituted against a particular threshold value denoted $N_0$. In particular, the threshold value $N_0$ can be defined arbitrarily, as a function of the available calculation facilities, by trial and error. After choosing the size of the previously mentioned sub-matrix $A_S$, and if that sub-matrix is sufficiently small, the number $N_{AS}$ of elements thereof being less than $N_0$, step 1003 leads to the execution of a step 1004 in which the $(P+1)^{th}$ row of blocks of the pseudo-inverse matrix of the sub-matrix $A_S$ is calculated directly, this step 1004 being in turn followed directly by a step 1005 of filtering the received samples of the sample column vector e using the $(P+1)^{th}$ row of blocks of the pseudo-inverse matrix of the sub-matrix $A_S$. The filtering of step 1005 is in fact applied successively to the block of samples $e_S$ of size $Ka \cdot Q \cdot S$ by successively shifting $Ka \cdot Q$ samples, this shift corresponding to the mode of operation previously referred to in connection with FIGS. 2a and 2b.

If the number of elements $N_{AS}$ of the sub-matrix $A_S$ is not less than the threshold value $N_0$, step 1003 is instead followed by a step 1006 of calculating the product of the transconjugate sub-matrix $A_S$, denoted $A_S^+$, and the aforementioned matrix $A_S$. This step 1006 is itself followed by a step 1007 of calculating at least one row of the $(P+1)^{th}$ row of blocks of the inverse of the product $A_S^+ \cdot A_S$ calculated in the preceding step 1006. The calculation of step 1007 can use a Cholesky decomposition.

Step 1007 is itself followed by a step 1008 of calculating, for every block of received samples $e_S$ of size $Ka \cdot Q \cdot S$ of the sample column vector e, the product $A_S^+ \cdot e_S$ of the transconjugate sub-matrix $A_S^+$ of the sub-matrix $A_S$ and of this block of received samples. In a manner similar to that of step 1005, each block $e_S$ is obtained by successively shifting $Ka \cdot Q$ samples, as shown in FIGS. 2a and 2b.

Step 1008 is then followed by a step 1009 of filtering each product $A_S^+ \cdot e_S$ obtained in the preceding step 1008 using the row(s) of the $(P+1)^{th}$ row of blocks of the inverse of the product $A_S^+ \cdot A_S$.

What is claimed is:

1. A method of conjoint detection of a set of K simultaneously active CDMA codes received at Ka antennas of a mobile transceiver, said codes being transmitted via a multipath stationary linear transmission channel with Gaussian additional white noise and satisfying the equation $e = A \cdot d + n$ where A is the transfer matrix of said multipath stationary linear channel, d is the set of symbols of the codes to be transmitted, n is the additional noise vector and e is the set of received samples, in which method an estimate $\delta$ of the set d of symbols of the codes is obtained by pseudo-inversion of said transfer matrix of the form $\delta = (A^+ \cdot A)^{-1} \cdot A^+ \cdot e$ where the symbol + denotes the transposition and complex conjugation operator, in which, for a set of transfer sub-matrices $A_S$ corresponding to a number S of rows of blocks of said transfer matrix A, said method determines a set of equalising filters for successively estimating all the symbols transmitted by the CDMA codes from a particular number of received samples $e_S$.

2. The method of claim 1, in which, for any transverse sub-matrix $A_S$ satisfying the equation:

$$e_S = A_S \cdot d_{S+P}$$

where $e_S$ is the sub-set of samples received at the Ka antennas comprising S blocks of samples, the number S satisfies the equation:

$$(S+P) \cdot K < Ka \cdot Q \cdot S$$

in which equation Q is the spreading factor of the CDMA code applied to each transmitted symbol and P is the length of the channel expressed as a number of symbol periods.

3. The method of claim 1, in which, for a transfer matrix A with dimensions $[M \times N \cdot K]$, where $M = Ka \cdot Q \cdot (N+P)$ and N is the number of symbols transmitted for each CDMA code in each transmitted half-burst, formed of $[(N+P) \times N]$ blocks each of size $[Ka \cdot Q \times K]$, the equalising multi-dimensional filters are formed by the $(P+1)^{th}$ row of blocks of the pseudo-inverse matrix $(A_S)^{-1}$ of said transfer sub-matrix $A_S$ satisfying the equation:

$$(A_S)^{-1} = (A_S^+ \cdot A_S)^{-1} \cdot A_S^+$$

in which the symbol $-1$ denotes the pseudo-inversion operator, and the $k^{th}$ row of this row of blocks defines the filter for the $k^{th}$ code.

4. The method of claim 3 in which a sliding window with an increment $Ka \cdot Q$ is applied to the samples of each code to obtain successively all the symbols transmitted by that code.

5. The method of claim 1 including the following steps:

temporally organising the column vector e of the samples received at the Ka antennas, constructing the blocks $B_i$, the $k^{th}$ column of the matrix consisting of $B_0, B_1, \ldots, B_p$ stacked one on top of the other in a column being made up of the first samples of the impulse responses of the global channels of the code k to the Ka antennas, then the second samples, and so on, choosing the number S of rows and constructing the sub-matrix $A_S$ from corresponding blocks $B_i$ obtained in the preceding step, if the number of elements of the sub-matrix $A_S$ is less than a particular threshold value, following application of a criterion of choice to the size of the sub-matrix $A_S$:

calculating the $(P+1)^{th}$ row of blocks of the pseudo-inverse of the sub-matrix $A_S$, filtering the received samples of the sample column vector e using the $(P+1)^{th}$ row of blocks of the pseudo-inverse matrix of the sub-matrix $A_S$, applying the filtering of the preceding step successively to the blocks of samples $e_S$ of size Ka.Q.S by successively shifting Ka.Q samples, otherwise, if the number of elements of the sub-matrix $A_S$ is not less than said particular threshold value:

calculating the product of the transconjugate matrix $A_S$ and the sub-matrix $A_S$, calculating at least one row of the $(P+1)^{th}$ row of blocks of the inverse of the product calculated in the preceding step, calculating, for every block of samples received $e_S$ of the sample column vector e of size Ka.Q.S, the product $A_S^+.e_S$ of the transconjugate sub-matrix $A_S^+$ of the sub-matrix $A_S$ and of the block of received samples, each block $e_S$ being obtained by successively shifting Ka.Q samples, and filtering each product $A_S^+.e_S$ obtained in the preceding step using said at least one row of the $(P+1)^{th}$ row of blocks of the inverse of the product $A_S^+.A_S$.

* * * * *